United States Patent [19]
Doner et al.

[11] Patent Number: 6,139,092
[45] Date of Patent: Oct. 31, 2000

[54] MOTOR VEHICLE FRONT STRUCTURE

[75] Inventors: Bradley William Doner, Dearborn; Paul Avery Mayer, Ann Arbor; Robin Cambell Miller, Riverview, all of Mich.

[73] Assignee: Ford Global Technologies, Inc., Dearborn, Mich.

[21] Appl. No.: 09/228,114

[22] Filed: Jan. 11, 1999

[51] Int. Cl.[7] .......................... B60R 19/56; B60R 19/24
[52] U.S. Cl. .......................... 296/189; 293/138; 293/155
[58] Field of Search .................... 293/138, 140, 293/154, 155; 296/188, 189, 194, 203.01, 203.02

[56] References Cited

U.S. PATENT DOCUMENTS

| | | | |
|---|---|---|---|
| 1,344,649 | 6/1920 | Pancoast et al. | 293/140 |
| 1,526,511 | 2/1925 | Starck | 293/140 |
| 1,551,369 | 8/1925 | Cox | 293/155 |
| 1,675,288 | 6/1928 | Walter | 296/135 |
| 5,348,114 | 9/1994 | Yamauchi | 180/291 |
| 5,409,289 | 4/1995 | Kalian et al. | 296/204 |

FOREIGN PATENT DOCUMENTS

| | | |
|---|---|---|
| 0-395-621-A1 | 10/1990 | European Pat. Off. . |
| 403025083 | 2/1991 | Japan . |
| 404005180 | 1/1992 | Japan . |

*Primary Examiner*—D. Glenn Dayoan
*Assistant Examiner*—Paul Chenevert
*Attorney, Agent, or Firm*—Gregory P. Brown

[57] ABSTRACT

A front structure of a motor vehicle increases the energy transfer and dissipation thereof within the front structure upon impact with another object. The front structure includes right and left front side frame members (12, 14) each having a front end (24,26). Right and left front spring hangers (34, 36) extend downward from the front side frame members at a point substantially adjacent to the front ends and each include a bottom end (58) having a mounting flange (56) thereon. A cross member (20) extends transversely within the motor vehicle, having right and left cross member ends (62) attached to the mounting flange (56).

20 Claims, 3 Drawing Sheets

MOTOR VEHICLE FRONT STRUCTURE

BACKGROUND OF THE INVENTION

1. Field of the Invention

The present invention relates generally to chassis structures for motor vehicles. More particularly the present invention relates to front structures for motor vehicles.

2. Disclosure Information

The use of bumpers in vehicles to help disperse impact energy has long been known. However, certain types of vehicles requires placement of bumpers on vehicle front structures in a manner that is not always efficient at transferring energy to the front structure upon impact with other objects, particularly objects that are low to the ground. Lowering the bumpers to overcome this difficulty would either diminish the ability of the bumper to serve its primary intended purposes, or severely restrict the maneuverability of the vehicle under certain conditions.

It would be desirable to overcome the aforenoted difficulties with front vehicle structures by providing a simple, low cost vehicle structure capable of transferring energy into the vehicle structure where it can be absorbed and dissipated in a more efficient manner while not compromising the maneuverability.

SUMMARY OF THE INVENTION

Therefore, the present invention provides an improvement over conventional motor vehicles by providing a front structure that allows energy transfer and dissipation during an impact with another object at higher levels than achieved heretofore.

In accordance with the present invention, a front structure for a motor vehicle includes a right and left front side frame members having primary axes extending generally longitudinally within the motor vehicle with each a front end. Right and left front spring hangers extend downward from the front side frame members at a point substantially adjacent to the front ends and include bottom ends, each having mounting flanges thereon. A cross member extends transversely within the motor vehicle, having right and left cross member ends attached to the mounting flanges. These components combine such that upon impact of the front structure of the motor vehicle with another object, the cross member, in cooperation with said right and left spring hangers, increases energy transferred from the impact into right and left front side frame members, thereby reducing energy transferred to the object initially impacted by the motor vehicle.

It is an advantage of the present invention to provide a simple, low cost front vehicle structure capable of providing greater impact energy management then previously possible.

DETAILED DESCRIPTION OF THE PREFERRED EMBODIMENT

Figure 1:
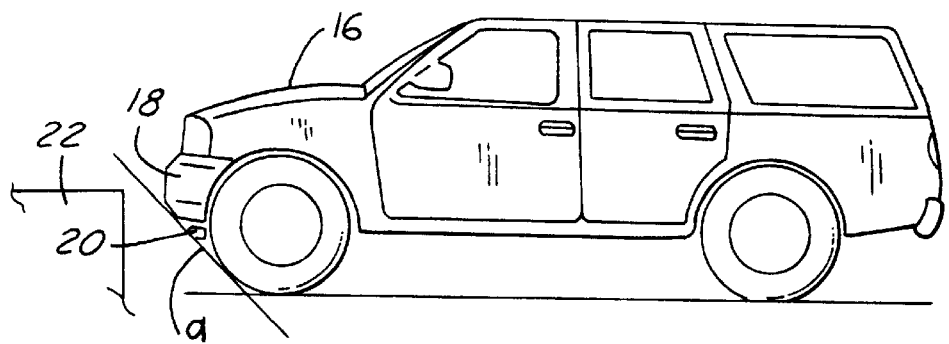
FIG. 1 is a side elevational view of a motor vehicle having a front structure constructed in accordance with the present invention.
Figure 3:
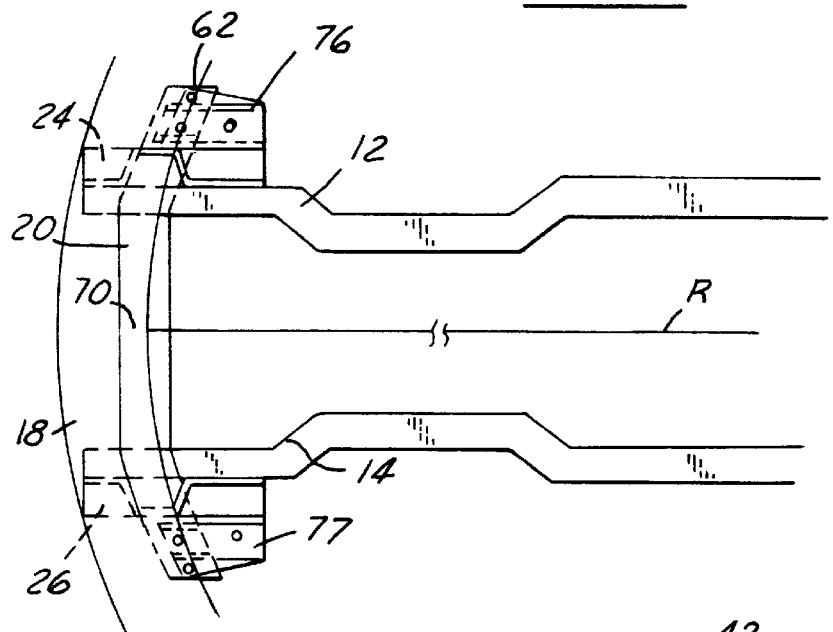
FIG. 3 is a top view of a front vehicle structure constructed in accordance with the present invention.
Figure 2:
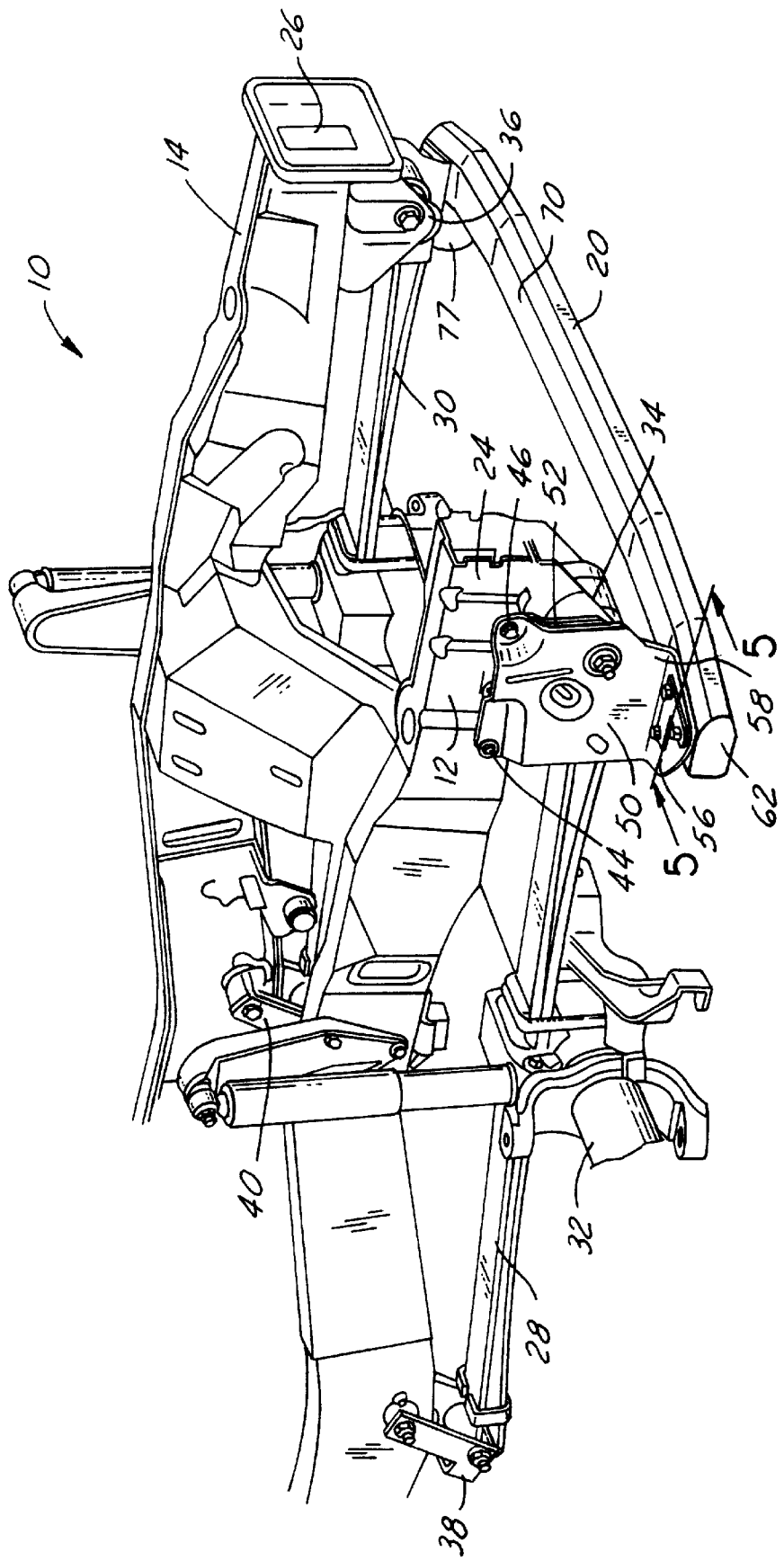
FIG. 2 is a front perspective of a front vehicle structure constructed in accordance with the present invention.

Referring now to FIGS. 1 through 3, a novel front structure of a motor vehicle is shown. The front structure 10 includes a right and left longitudinally oriented front side frame members 12, 14 supporting a body structure 16 thereon. A front bumper 18 and a cross member 20 each are rigidly attached to the right and left front side frame members 12, 14 in a manner to increase the amount of energy transferred into and absorbed by the right and left frame side members upon impact with another object 22. Beneficially, the energy absorbed can be dissipated in a controlled manner, reducing the energy imparted to the impacted object. The present invention will be described in relation to a vehicle having a body on frame construction, however, it should be recognized that the present invention applies equally to a motor vehicle having a unibody structure wherein the front side rails are integral components of the floor pan.

The right and left front side frame members 12, 41 each include front ends include 24, 26. A pair of leaf springs 28 and 30 interconnect an axle 32 to the right and left front side frame members through a set of front spring hangers 34,36 and rear spring shackles 38, 40. The front right spring hanger will now be described in detail, it being understood that the left front spring hanger is merely the symmetric opposite thereof.

Figure 4:
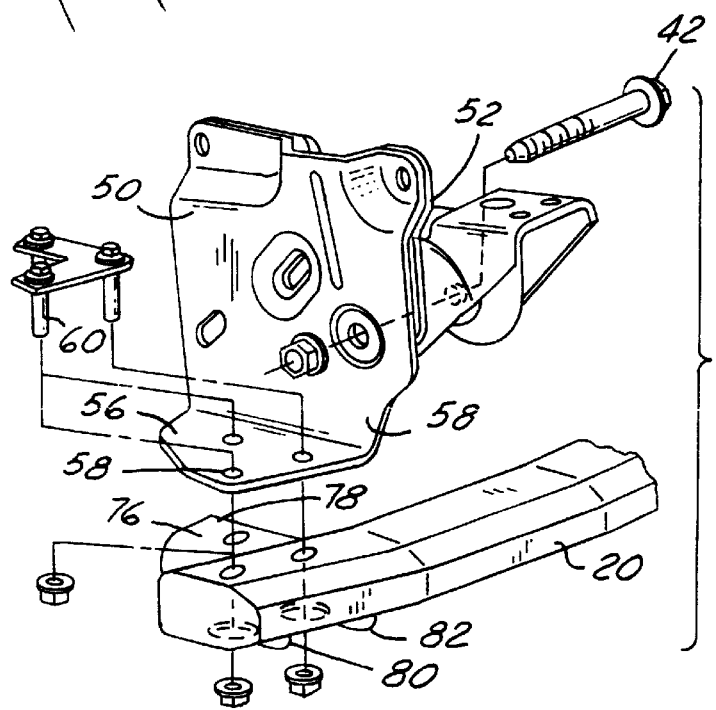
FIG. 4 is a partial exploded perspective view of a front structure constructed in accordance with the present invention.

Referring now to FIGS. 2 and 4, the right front spring hanger 34 attaches to an underside of the right front side frame member 12 adjacent to the front end 24. The right front spring hanger includes a threaded fastener 42 passing transversely through the spring hanger to retain the leaf spring 28 therein. This threaded fastener together with two additional threaded fasteners 44, 46 secure an outer side plate 50 to an outer side 52 of the right front spring hanger 34. Welding can be used in combination with the fasteners, or alone depending on the application. It should be recognized, however, the benefit of the present invention could obtained regardless of how the outer side plate is attached, or even if the outer side plate were integrally stamped with the outer side of the spring hanger.

The outer side plate 50 includes a mounting flange 56 formed at a lower end 58 thereof. The mounting flange 56 turns outward, away from the front frame side member and includes three apertures 58 therein for receiving threaded fasteners 60 therethrough to secure a right end 62 of the cross member 20 to the lower end 58 of the outer side plate 50.

Referring now to FIGS. 1 through 3, the cross member 20 is mounted transversely within the vehicle below and rearward of the bumper 18. Preferably, the cross member 20 is positioned at a predetermined height and setback a predetermined distance from the bumper so as not to change the approach angle (alpha) of the vehicle. To further prevent the cross member from changing the approach angle, it can be seen that the cross member shares a similar radius of curvature, R, when viewed from above to the bumper. This allows the center 70 of the cross member to be placed as far forward as possible for impact with the object 22. Finally, with specific reference to FIG. 5, the cross member also includes a beveled leading lower edge 72 to improve approach angle. With these features, a vehicle can be equipped with the present invention with little or no change to the approach angle.

Figure 5:
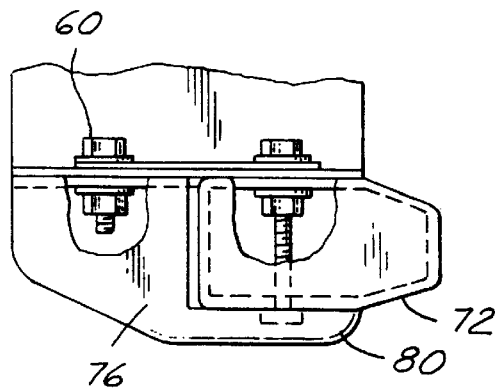
FIG. 5 is a section view taken along line 5—5 from FIG. 2 of a front structure constructed in accordance with the present invention.

Referring now to FIGS. 4 and 5, the cross member 20 attaches at its right and left ends to the right and left mounting flanges. For simplicity, only the right side of the cross member will be described, it being understood that the left side is the symmetric opposite of the right. In the preferred embodiment, three fasteners 60 are provided to resist bending about a vertical axis at the point of attachment. A cross member bracket 76,77 is welded to the right end and left end of the cross member to provide a mounting surface 78 for one of the three fasteners. The cross member brackets 76,77 also includes a pair of downwardly projecting fastener ribs 80, 82 to protect the fasteners from damage, allowing more convenient service.

Figure 6A:
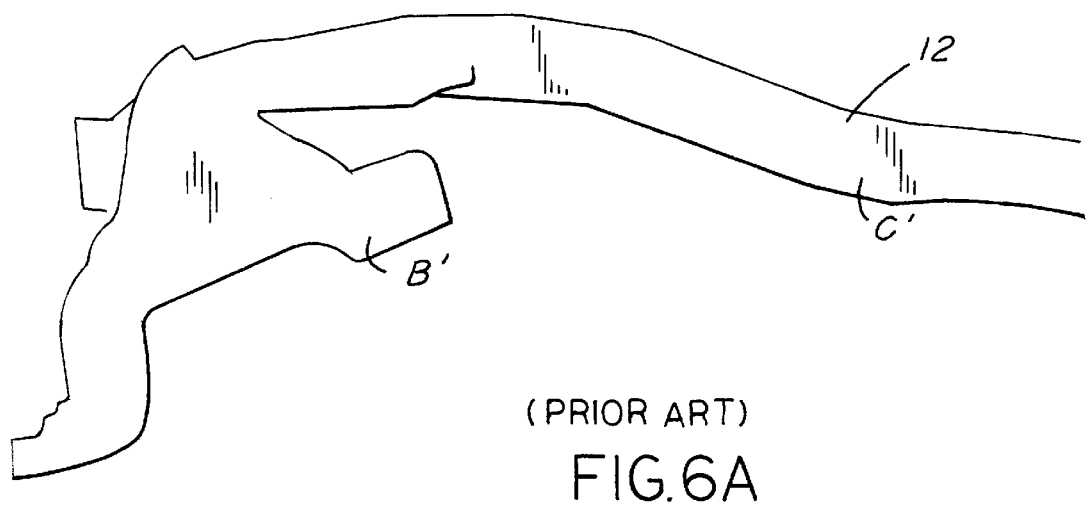
FIG. 6A is a side view of a prior art front structure after impacting another object.
Figure 6B:
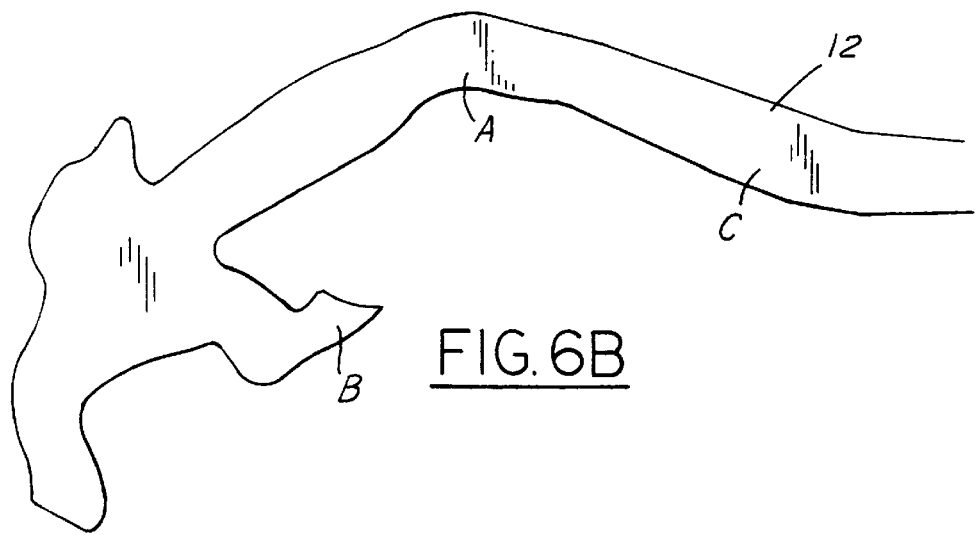
FIG. 6B is a side view of a front structure constructed in accordance with the present invention after impacting another object.

Referring back now to FIGS. 1 and 6A and 6B, it can be seen that the present invention, upon the impact of a motor vehicle with another object 22, increases the amount of energy transferred into and absorbed by the right and left front side frame members 12, 14. Specifically it has been observed using computer generated simulations that a vehicle equipped with the present invention will exhibit deformation as shown in FIG. 6B. There, the frame has given more at point A, allowing points B and C to come closer together, absorbing energy. A vehicle without the benefit of the present invention tends to exhibit behavior illustrated in FIG. 6A. Specifically, less energy is transferred to the right and left front side frame members, resulting in points B' and C' not getting closer together, indicating that less energy has been absorbed by the front structure in FIG. 6A than in FIG. 6B.

Various modifications and variations will no doubt occur to those skilled in the art to which this invention pertains. For instance, while the present invention has been described in the context of a vehicle having a leaf spring suspension with hangers, it would apply equally well to suspensions having coil springs, using a downwardly extending bracket in place of the front spring hanger. This and all other variations which basically rely on the teachings by which this disclosure has advanced the art are properly considered within the scope of this invention as defined by the appended claims.

We claim:

1. A front structure for a motor vehicle comprising:
   a right front side frame member having a primary axis extending generally longitudinally within the motor vehicle and having a right front end;
   a left front side frame member having a primary axis extending generally longitudinally within the motor vehicle and having a left front end;
   a right front spring hanger extending downward from said right front side frame member substantially adjacent to said right front end;
   a left front spring hanger extending downward from said left front side frame member substantially adjacent to said left front end;
   said right front spring hanger having a bottom end including a mounting flange;
   said left front spring hanger having a bottom end including a mounting flange;
   a cross member extending transversely to the motor vehicle and having right and left cross member ends attached beneath said mounting flanges of said right and left front spring hangers; and
   wherein, upon impact of said front structure of the motor vehicle with another object, said cross member, in cooperation with said right and left spring hangers, increases energy transferred from said impact into right and left front side frame members, thereby reducing energy transferred to said object initially impacted by the motor vehicle.

2. The front structure as claimed in claim 1, wherein said mounting flanges of said right and left front spring hangers each include a plurality of apertures for receiving therethrough a plurality of fasteners for securely attaching said cross member thereto.

3. The front structure as claimed in claim 2, said right and left cross member ends each further comprise downward projecting fastener ribs disposed on a lower surface of said cross member adjacent to said plurality of fasteners.

4. The front structure as claimed in claim 1, further comprising a bumper member extending transversely to the motor vehicle and being attached to said right and left front ends of said right and left front side frame members such that said cross member is mounted below and rearward of said bumper.

5. The front structure as claimed in claim 1, wherein said cross member is located rearward of a predetermined approach angle.

6. The front structure as claimed in claim 1, wherein said cross member further includes a beveled forward leading edge so as to allow maximum forward placement of said cross member at a predetermined height and approach angle.

7. The front structure as claimed in claim 1, wherein a center portion of said cross member extends forward of said right and left ends of said cross member, thereby defining a radius of curvature of said cross member.

8. The front structure as claimed in claim 1, wherein said right and left front spring hangers each further comprise outer side plates disposed on outer sides of said right and left front spring hangers, said outer side plates having said mounting flanges disposed thereon.

9. A front structure for a motor vehicle comprising:
   a right front side frame member having a primary axis extending generally longitudinally within the motor vehicle and having a right front end;
   a left front side frame member having a primary axis extending generally longitudinally within the motor vehicle and having a left front end;
   a bumper member extending transversely to the motor vehicle and being attached to said right and left front ends of said right and left front side frame members;
   a right front spring hanger extending downward from said right front side frame member substantially adjacent to said right front end;
   a left front spring hanger extending downward from said left front side frame member substantially adjacent to said left front end;
   said right front spring hanger having a bottom end including a mounting flange;
   said left front spring hanger having a bottom end including a mounting flange;
   a cross member extending transversely to the motor vehicle below and rearward of said bumper and having right and left cross member ends attached to said mounting flanges of said right and left front spring hangers; and
   wherein, upon impact of said front structure of the motor vehicle with another object, said cross member, in cooperation with said right and left spring hangers, increases energy transferred from said impact into right and left front side frame members, thereby reducing energy transferred to said object initially impacted by the motor vehicle.

10. The front structure as claimed in claim 9, wherein said mounting flanges of said right and left front spring hangers each include a plurality of apertures for receiving therethrough a plurality of fasteners for securely attaching said cross member thereto.

11. The front structure as claimed in claim 10, said right and left cross member ends each further comprise downward projecting fastener ribs disposed on a lower surface of said cross member adjacent to said plurality of fasteners.

12. The front structure as claimed in claim 9, wherein said cross member is located rearward of a predetermined approach angle.

13. The front structure as claimed in claim 9, wherein said cross member further includes a beveled forward leading edge so as to allow maximum forward placement of said cross member at a predetermined height and approach angle.

14. The front structure as claimed in claim 9, wherein a center portion of said cross member extends forward of said right and left ends of said cross member, thereby defining a radius of curvature of said cross member.

15. The front structure as claimed in claim 9, wherein said right and left front spring hangers each further comprise outer side plates disposed on outer sides of said right and left front spring hangers, said outer side plates having said mounting flanges disposed thereon.

16. A front structure for a motor vehicle comprising:

a right front side frame member having a primary axis extending generally longitudinally within the motor vehicle and having a right front end;

a left front side frame member having a primary axis extending generally longitudinally within the motor vehicle and having a left front end;

a bumper member extending transversely to the motor vehicle and being attached to said right and left front ends of said right and left front side frame members;

a right front spring hanger extending downward from said right front side frame member substantially adjacent to said right front end;

a left front spring hanger extending downward from said left front side frame member substantially adjacent to said left front end;

said right front spring hanger having an outer side plate attached to an outer side of said spring hanger and having a mounting flange thereon;

said left front spring hanger having an outer side plate attached to an outer side of said spring hanger and having a mounting flange thereon;

a cross member extending transversely to the motor vehicle below and rearward of said bumper and having right and left cross member ends attached to said mounting flanges of said right and left front spring hangers; and wherein, upon impact of said front structure of the motor vehicle with another object, said cross member, in cooperation with said right and left spring hangers, increases energy transferred from said impact into right and left front side frame members, thereby reducing energy transferred to said object initially impacted by the motor vehicle.

17. The front structure as claimed in claim 16, wherein said mounting flanges each include a plurality of apertures for receiving therethrough a plurality of fasteners for securely attaching said cross member thereto.

18. The front structure as claimed in claim 17, said right and left cross member ends each further comprise downward projecting fastener ribs disposed on a lower surface of said cross member adjacent to said plurality of fasteners.

19. The front structure as claimed in claim 16, wherein said cross member is located rearward of a predetermined approach angle.

20. The front structure as claimed in claim 16, wherein said cross member further includes a beveled forward leading edge so as to allow maximum forward placement of said cross member at a predetermined height and approach angle.

* * * * *